United States Patent
Witzigreuter et al.

(10) Patent No.: US 6,436,564 B1
(45) Date of Patent: Aug. 20, 2002

(54) AIR MOVER FOR A BATTERY UTILIZING A VARIABLE VOLUME ENCLOSURE

(75) Inventors: John D. Witzigreuter, Kennesaw; Jeffrey E. Young, Peachtree City, both of GA (US)

(73) Assignee: AER Energy Resources, Inc., Smryna, GA (US)

( * ) Notice: Subject to any disclaimer, the term of this patent is extended or adjusted under 35 U.S.C. 154(b) by 0 days.

(21) Appl. No.: 09/216,118

(22) Filed: Dec. 18, 1998

(51) Int. Cl.$^7$ .................. H01M 12/06; H01M 2/12; B65D 32/24; B65D 33/01
(52) U.S. Cl. .................. 429/27; 429/24; 429/62; 429/82; 383/45; 383/103
(58) Field of Search ................. 429/7, 24, 27, 429/62, 82; 383/2, 33, 45, 103, 121.1

(56) References Cited

U.S. PATENT DOCUMENTS

| | | | |
|---|---|---|---|
| 1,956,243 A | | 4/1934 | McEachron et al. |
| 2,027,310 A | * | 1/1936 | Smith |
| 2,105,376 A | * | 1/1938 | Scott ........................... 383/45 |
| 2,639,190 A | | 5/1953 | Sitzer |
| 3,160,528 A | | 12/1964 | Dengler et al. |
| 3,474,844 A | * | 10/1969 | Lindstrom et al. .......... 220/666 |
| 3,613,732 A | | 10/1971 | Willson |
| 3,963,519 A | * | 6/1976 | Louie |
| 4,054,725 A | * | 10/1977 | Tuburaya ..................... 429/29 |
| 4,063,826 A | | 12/1977 | Riepe ......................... 417/410 |
| 4,112,198 A | | 9/1978 | Przybyla et al. .............. 429/27 |
| 4,211,830 A | * | 7/1980 | Chevet ........................ 429/27 |
| 4,214,044 A | * | 7/1980 | Chevet et al. ................ 429/27 |
| 4,254,190 A | * | 3/1981 | Zaromb ..................... 429/27 X |
| 4,262,062 A | | 4/1981 | Zatsky |
| 4,269,906 A | | 5/1981 | Schmechtig ................. 429/67 |
| 4,303,743 A | * | 12/1981 | Réau ............................ 429/27 |
| 4,405,387 A | | 9/1983 | Albrecht et al. ........ 148/11.5 R |
| 4,470,152 A | * | 9/1984 | Blankenship .............. 383/45 X |
| 4,521,497 A | | 6/1985 | Tamminen .................... 429/27 |
| 4,560,626 A | * | 12/1985 | Joy .............................. 429/27 |
| 4,648,807 A | | 3/1987 | Tippetts et al. |
| 4,822,698 A | | 4/1989 | Jackovitz et al. ............. 429/27 |
| 4,855,195 A | | 8/1989 | Georgopoulos et al. ...... 429/54 |
| 4,913,983 A | | 4/1990 | Cheiky ........................ 429/13 |
| 5,011,380 A | | 4/1991 | Kovacs |
| 5,066,204 A | | 11/1991 | Point et al. |
| 5,085,562 A | | 2/1992 | Van Lintel |
| 5,211,371 A | | 5/1993 | Coffee ......................... 251/11 |
| 5,258,239 A | | 11/1993 | Kobayashi ................... 429/27 |
| 5,304,431 A | | 4/1994 | Schumm, Jr. |
| 5,325,880 A | | 7/1994 | Johnson et al. ................ 137/1 |
| 5,328,778 A | | 7/1994 | Woodruff et al. ............. 429/27 |
| 5,354,625 A | | 10/1994 | Bentz et al. ................... 429/17 |
| 5,356,729 A | | 10/1994 | Pedicini |
| 5,387,477 A | | 2/1995 | Cheiky ........................ 429/26 |

(List continued on next page.)

FOREIGN PATENT DOCUMENTS

| | | |
|---|---|---|
| JP | 06 223882 A | 8/1994 |
| RU | 2 106 722 C | 3/1998 |

OTHER PUBLICATIONS

"Using Shape Memory Wires—Part Two," Mondo–tronics, Inc., pp. 2–1 through 2–12 (Date Unknown).
"Flexinol™—Actuator Wire A Solid State Actuator That Moves By Molecular Restructing," Dynalloy, Inc. Makers of Dynamic Alloys two pages (Date Unknown).

*Primary Examiner*—Stephen Kalafut
(74) *Attorney, Agent, or Firm*—Alston & Bird LLP

(57) ABSTRACT

The metal-air battery includes an air mover mechanism located in the cathode plenum space of one or more metal-air cells. The air mover is an enclosure isolating the air cathode, with a mechanism for expanding and contracting the volume of the enclosure to move air in and out of the enclosure. Prismatic and cylindrical batteries incorporating the invention are described.

44 Claims, 6 Drawing Sheets

U.S. PATENT DOCUMENTS

| | | | | |
|---|---|---|---|---|
| 5,419,981 A | * | 5/1995 | Golben | 429/66 X |
| 5,466,932 A | | 11/1995 | Young et al. | |
| 5,486,429 A | | 1/1996 | Thibault | |
| 5,522,712 A | | 6/1996 | Winn | 417/436 |
| 5,529,465 A | | 6/1996 | Zengerle et al. | |
| 5,560,999 A | | 10/1996 | Pedicini et al. | |
| 5,567,284 A | * | 10/1996 | Bauer et al. | 429/27 X |
| 5,599,174 A | | 2/1997 | Cook et al. | |
| 5,619,177 A | | 4/1997 | Johnson et al. | 377/140 |
| 5,622,482 A | * | 4/1997 | Lee | 417/321 |
| 5,639,568 A | | 6/1997 | Pedicini et al. | 429/27 |
| 5,691,074 A | | 11/1997 | Pedicini | 429/27 |
| 5,691,075 A | | 11/1997 | Batawi | |
| 5,730,587 A | | 3/1998 | Snyder et al. | |
| 5,747,187 A | * | 5/1998 | Byon | 429/58 |
| 5,758,823 A | * | 6/1998 | Glezer et al. | 239/4 |
| 5,759,014 A | | 6/1998 | Van Lintel | |
| 5,786,980 A | * | 7/1998 | Evans | 429/34 X |
| 5,861,703 A | | 1/1999 | Losinski | |
| 5,914,507 A | | 6/1999 | Polla et al. | |
| 5,916,704 A | * | 6/1999 | Lewin et al. | 429/82 X |
| 6,033,191 A | | 3/2000 | Kamper et al. | |

* cited by examiner

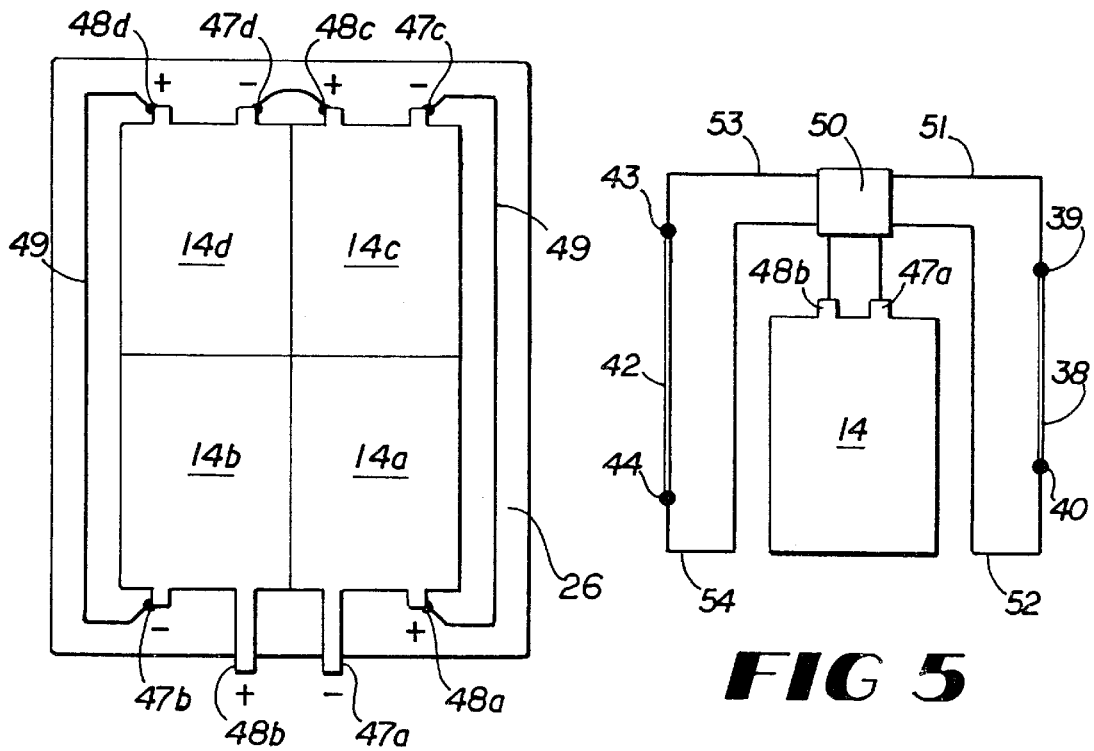
FIG 4
FIG 5
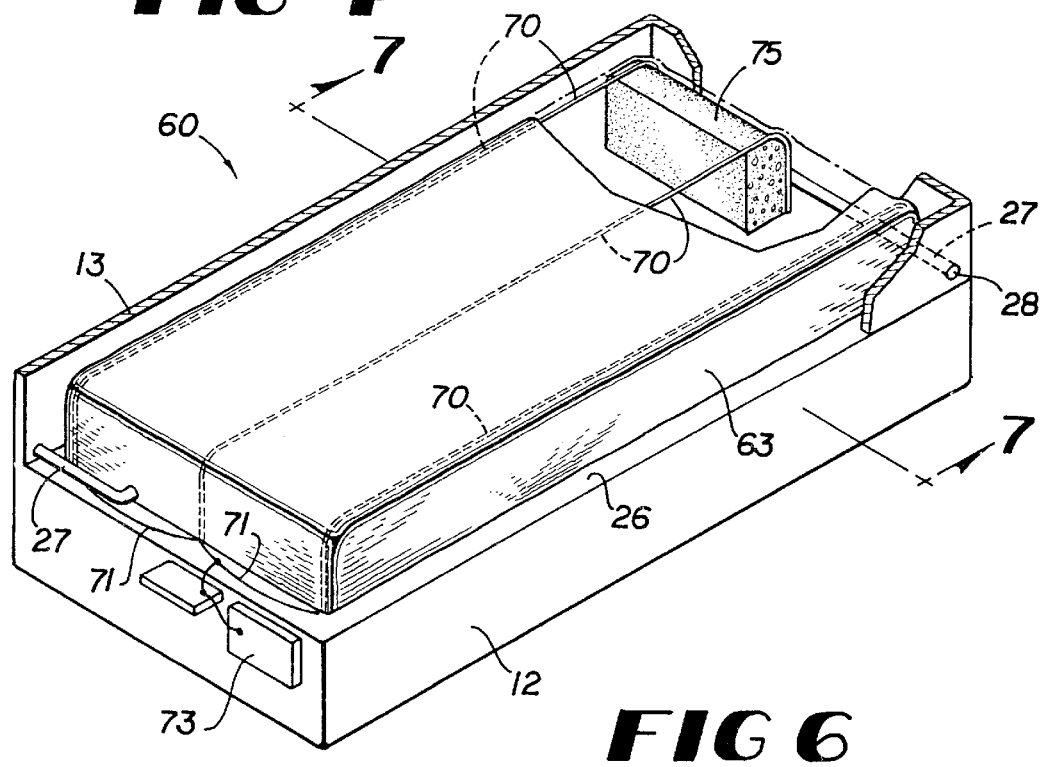
FIG 6

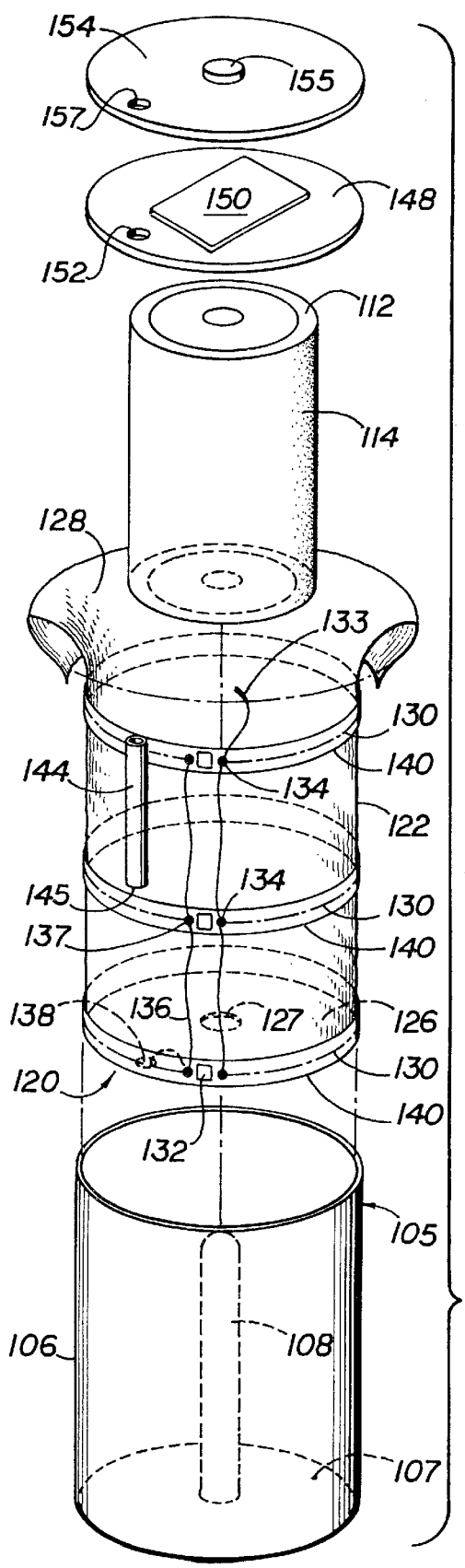
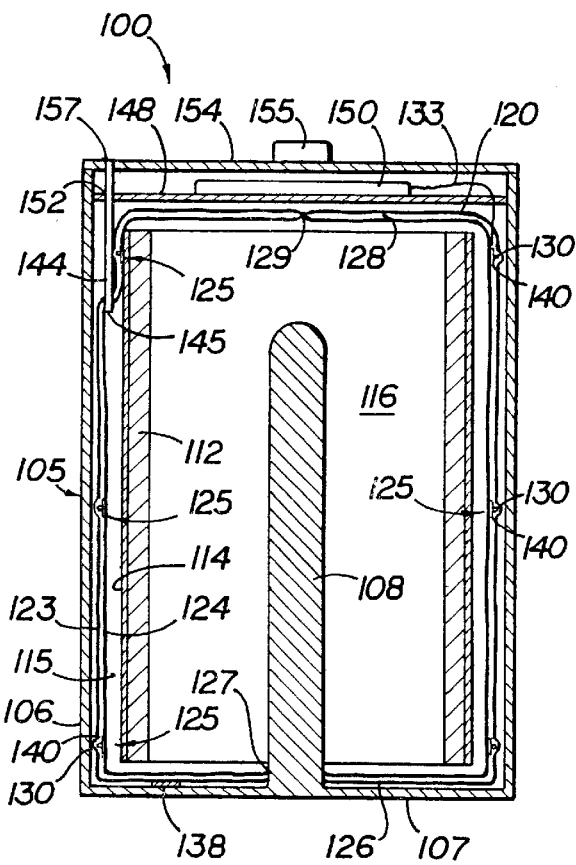
FIG. 12
FIG. 13

CIRCUIT TIMING DIAGRAM

AIR MOVER FOR A BATTERY UTILIZING A VARIABLE VOLUME ENCLOSURE

RELATED APPLICATION

The following patent applications for related subject matter,
"CYLINDRICAL METAL-AIR BATTERY WITH A CYLINDRICAL PERIPHERAL AIR CATHODE" U.S. patent application Ser. No. 09/215,820; now U.S. Pat. No. 6,274,261;
"AIR MANAGER SYSTEMS FOR METAL-AIR BATTERIES UTILIZING A DIAPHRAGM OR BELLOWS" U.S. patent application Ser. No. 09/216,026 pending,
"DIFFUSION CONTROLLED AIR VENT WITH AN INTERIOR FAN" U.S. patent application No. 09/215,879 pending,
"UNIFORM SHELL FOR A METAL-AIR BATTERY" U.S. patent application No. 09/216,114, now U.S. Pat. No. 6,235,418;
"LOAD RESPONSIVE AIR DOOR FOR A METAL-AIR CELL" U.S. patent application Ser. No. 09/216,115, now U.S. Pat. No. 6,350,537;
"Geometry Change Diffusion Tube For Metal-Air Batteries" U.S. patent application No. 09/216,273, now U.S. Pat. No. 6,342,314;
"AIR-MANAGING SYSTEM FOR METAL-AIR BATTERY USING RESEALABLE SEPTUM" U.S. patent Ser. No. 09/216,343, now U.S. Pat. No. 6,168,877; and
"AIR DELIVERY SYSTEM WITH VOLUME-CHANGEABLE PLENUM OF METAL-AIR BATTERY" U.S. patent application No. 09/216,660, now U.S. Pat. No. 6,346,341;
all of which are incorporated herein by reference, have been filed concurrently with the present application.

TECHNICAL FIELD

The present invention relates to metal-air batteries of the type that are supplied with reactive gas by an active air moving device, and more particularly relates to an air mover mechanism located in the cathode plenum space of one or more metal-air cells.

BACKGROUND OF THE INVENTION

Generally described, a metal-air cell, such as a zinc-air cell, uses one or more air permeable cathodes separated from a metallic zinc anode by an aqueous electrolyte. During operation of the cell, oxygen from the ambient air is converted at the one or more cathodes to produce hydroxide ions. The metallic zinc anode is then oxidized by the hydroxide ions. Water and electrons are released in this electrochemical reaction to provide electrical power.

Initially, metal-air cells found limited commercial use in devices, such as hearing aids, which required a low level of power. In these cells, the air openings which admitted air to the air cathode were so small that the cells could operate for some time without flooding or drying out as a result of the typical difference between the outside relative humidity and the water vapor pressure within the cell. However, the power output of such cells was too low to operate devices such as camcorders, cellular phones, or laptop computers. Furthermore, enlarging the air openings of a typical "button cell" was not practical because it would lead to premature failure as a result of flooding or drying out.

In order to increase the power output of metal-air cells so that they could be used to operate devices such as camcorders, cellular phones, or laptop computers, air managers were developed with a view to providing a flow of reactive air to the air cathodes of one or more metal-air cells while isolating the cells from environmental air and humidity when no output is required. As compared to conventional electrochemical power sources, metal-air cells containing air managers provide relatively high power output and long lifetime with relatively low weight. These advantages are due in part to the fact that metal-air cells utilize oxygen from the ambient air as the reactant in the electrochemical process as opposed to a heavier material such as a metal or a metallic composition. Examples of air managers are shown in U.S. Pat. Nos. 4,913,983, 5,356,729, and 5,691,074.

A disadvantage of most air managers, however, is that they distribute air within a plenum adjacent to the air electrode, and the plenum requires an empty volume of space. Furthermore, an important component of a successful air manager is an air moving device, typically a fan or an air pump. In the past, air moving devices used in metal-air batteries have been bulky relative to the volume of the metal-air cells. As a result, space that could otherwise be used for battery chemistry to prolong the life of the battery must be used to create a plenum adjacent to the air electrode and to accommodate an air moving device. This loss of space presents a particular challenge in attempts to provide a practical metal-air cell in small enclosures such as the "AA" cylindrical size now used as a standard in many electronic devices.

In addition to being bulky, air moving devices used in metal-air batteries also consume energy stored in the metal-air cells that might otherwise be delivered as power output to a load. Therefore, while a key advantage of metal-air cells is their high energy density resulting from the low weight of the air electrode, this advantage is compromised by the space and power required for an effective air manager.

As stated previously, air managers have been developed with a view to isolating the metal-air cells from ambient air when no output is required. A factor contributing to the problem of isolating metal-air cells from the ambient air is the porosity of inexpensive plastics typically used for molding cases for containing components of the cells. The amount of water vapor that seeps through plastic walls of a cell can be on the same order of magnitude as the amount of water vapor that passes into the cell through one or two diffusion limiting isolation tubes. Utilizing less porous materials or coating the plastic walls to reduce transmission of gases would add significant expense to the cost of each cell.

Therefore, there has been a need in the art for an air manager incorporating an air moving device that occupies less of the volume available for battery chemistry, is usable with advanced systems for isolating the air electrodes when power is not being drawn from the metal-air cell, and consumes a relatively low amount of power. Also, there is a further need in the art of metal-air cells to reduce the significance of case wall porosity.

SUMMARY OF THE INVENTION

The present invention seeks to provide an improved air moving device for metal-air cells that occupies a minimal amount of the volume available for battery chemistry, is usable with advanced systems for isolating the air electrodes when power is not being drawn from the metal air cell, and consumes a relatively low amount of power.

In accordance with the invention, this object is accomplished by providing an air-moving device for supplying ambient air to the air electrodes of a metal-air cell which includes a variable volume enclosure surrounding a plenum adjacent to the air electrode, means for varying the volume of this enclosure, and one or more air passageways which allow air flow into and out of the enclosure while its volume is changing. The variable volume enclosure serves to isolate the electrode from the ambient air except through the air passageways and operates so that air flows into the enclosure when its volume is increasing (as a result of a decrease in pressure inside the enclosure) and out of the enclosure when its volume is decreasing increasing (as a result of an increase in pressure inside the enclosure). Thus, the air moving device brings in new ambient air and distributes it across the surface of the air electrode during operation of the metal-air cell.

In one embodiment of the invention, the air passageways comprise diffusion limiting passageways. The variable volume enclosure may be a rigid plate connected to a deformable wall that extends to the frame surrounding the electrodes of one or more cells. The air passageways may extend through the rigid plate or the deformable wall. In this embodiment, the volume of the enclosure is varied by alternately moving the rigid plate toward and away from the air electrode. The means for alternately moving the rigid plate toward the air electrode may be a linear actuator such as a line engaging the rigid plate and a fixed member below the rigid plate and means for selectively pulling the rigid plate toward the fixed member using the line. The means for alternately moving the rigid plate away from the air electrode may be a line engaging the rigid plate and the outer casing of the metal-air power supply and means for selectively pulling the rigid plate toward the outer casing using the line. The lines may be shape memory alloy wires and both the means for selectively pulling the rigid plate toward the outer casing and the means for selectively pulling the rigid plate toward the fixed member may be an electrical circuit connected to supply current through the wires to shrink their length. Alternatively, the means for selectively pulling the rigid plate toward the outer casing and the means for selectively pulling the rigid plate toward the fixed member may also comprise winches connected to reel in the lines. In a modified embodiment, the means for alternately moving the rigid plate away from the air electrode may be one or more spring members, such as foam blocks, positioned between the rigid plate and the air electrode.

In one embodiment, an indirect linear actuator is provided to move the plate. In this configuration, the lines may extend substantially parallel to the electrode and the means for selectively pulling the rigid plate toward the outer casing and the means for selectively pulling the rigid plate toward the fixed member may include a cam surface and a cam follower which transpose the movement of the rigid plate responsive to the movement of the lines into a direction substantially perpendicular to the electrode.

The air moving device may also include means for preventing the outward deformation of the deformable wall so that the volume of the variable volume enclosure decreases more efficiently as the rigid plate moves toward the electrode. The means for preventing the outward deformation of the deformable wall may include retaining structures which may be walls positioned outside the variable volume enclosure. Alternatively, the deformable walls may incorporate inwardly acting springs or elastic members to prevent outward bowing of the deformable wall.

In an alternative embodiment, the variable volume enclosure may be a collapsible bag with the air passageways extending through the collapsible bag. The means for alternately contracting and expanding the bag may be one or more lines engaging the bag; means for reducing an initial effective length of the lines to collapse the bag from an initial volume to a smaller volume; and means for returning the bag to the initial volume. The lines may be a plurality of shape memory wires retained to the bag; and the means for reducing an initial effective length of the lines may be an electrical circuit connected to supply current through the wires to shrink an initial diameter thereof. Or, the lines may be connected to a winch, as noted above. The means for returning the bag to the initial volume may be one or more spring members positioned to urge the bag back to its expanded shape, stretching the shape memory wires or unwinding the lines from a winch. Preferably, the bag comprises a two-ply material defining passageways in which the shape memory wires or winch-driven lines are captured, the wires moving longitudinally within the passageways.

Preferably, the panel and the deformable wall (or the entire bag of the second embodiment) are constructed of materials of very low porosity, to reduce the effect of higher porosity material that may be used for the outer case.

According to another embodiment, the present invention provides a cylindrical metal-air power supply, comprising a conductive cylindrical case body including a cylindrical case wall, a case bottom, and an anode current collector extending into the case body from the case bottom; a mixture of anode metal and electrolyte within the case body in contact with the anode current collector; an air cathode positioned around the mixture and spaced inwardly from an inner surface of the cylindrical case wall, a cylindrical cathode air plenum being formed inside the cylindrical case wall; a case cover including a terminal electrically connected to a cathode current collector of the air cathode and insulated from the conductive case body; an enclosure within the cathode air plenum around the air cathode; an air conduit connecting the interior of the enclosure to the atmosphere outside the case; and means for alternately contracting and expanding the volume of the enclosure within the cathode air plenum to move air in and out of the enclosure through the air conduit.

In one form of this embodiment, the air conduit comprises a diffusion limiting passageway. The means for alternately contracting and expanding the bag may be one or more lines engaging the bag, operated by means for reducing an initial effective length of the lines to collapse the bag from an initial volume to a smaller volume; and means for returning the bag to the initial volume. The lines may be a plurality of formed shape memory wires retained to the bag. In this case the means for reducing an initial effective length of the lines may be an electrical circuit connected to supply current through the wires to shrink an initial diameter thereof; and the means for returning the bag to the initial volume may be a plurality of arcuate wire springs retained to the bag. Preferably, the bag comprises a two-ply material defining passageways in which the shape memory alloy wires and the wire springs are captured, the wires and springs moving longitudinally within the passageways.

The bag of this embodiment preferably extends from an essentially sealed connection to the case body at a base of the anode current collector to cover the air cathode and anode mixture beneath the case cover. This optional construction avoids the need to form a sealed connection between the bag and the peripheral edge of the air cathode. Also, the power output of the battery can be high because of the large cylindrical air cathode area. The cell can be assembled easily by placing the bag over the anode current collector, dropping the cathode assembly into the bag, filling the interior of the cathode assembly with the anode paste, and sealing the bag over the top of the cathode assembly. If the bag is formed of a very low porosity material, and is sealed above and below the cell components, there is no need to have sealed joints or low porosity materials outside the bag.

Other objects, features and advantages of the present invention will become apparent upon reviewing the following detailed description of preferred embodiments of the invention, when taken in conjunction with the drawings and the appended claims.

BRIEF DESCRIPTION OF THE DRAWINGS

FIG. 4 is diagrammatic top view of the placement of four cells in the battery housing of FIG. 1.

FIG. 5 is a block diagram illustrating a control circuit for operating an air mover as shown in FIG. 1.

FIG. 6 is a pictorial view of an alternative air mover for prismatic batteries embodying the present invention, with portions broken away to show interior detail.

FIG. 12 is a side cross sectional view of a cylindrical metal-air cell embodying the present invention.

FIG. 13 is an exploded view of the components of the cell of FIG. 12.

DETAILED DESCRIPTION

Referring now in more detail to the drawings, in which like numerals refer to like parts throughout the several views, FIGS. 1—11 shows a metal-air battery 10 embodying the present invention, which provides an air moving mechanism located in the air electrode plenum.

Figure 1:
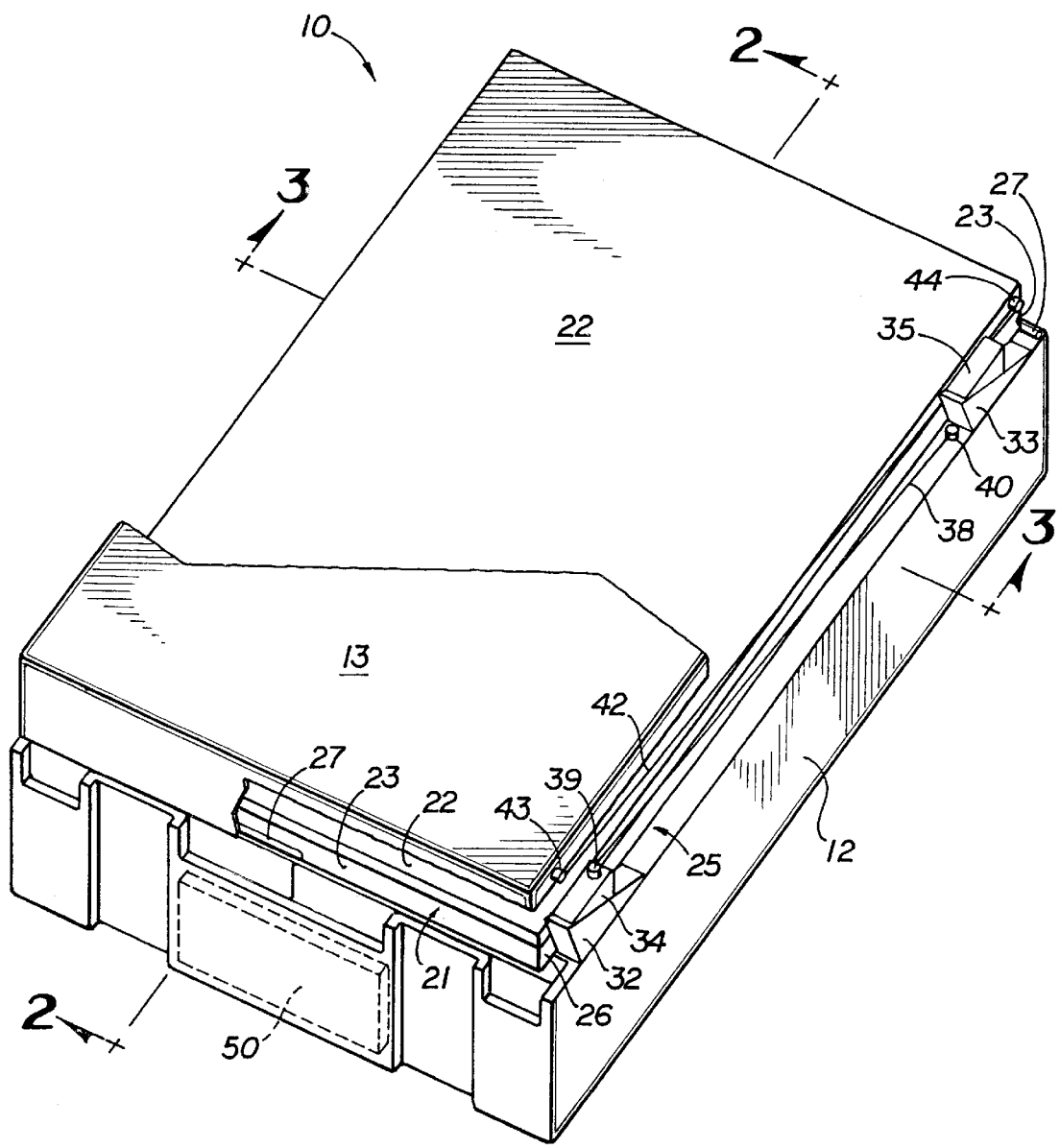
FIG. 1 is a pictorial view of a prismatic battery embodying the present invention, with portions broken away to show interior detail.
Figure 3:
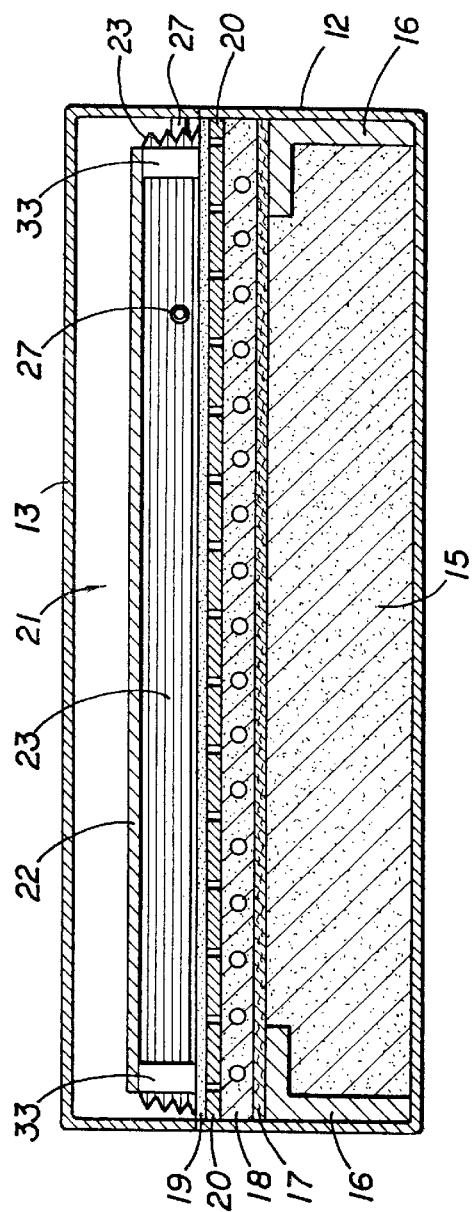
FIG. 3 is a side cross sectional view taken along line 3—3 of FIG. 2.

The metal-air battery 10 is principally contained within a rectangular lower battery case section 12 and an upper battery case section 13 shown in FIG. 1. It should be noted that while metal-air batteries are often operated with the cathode on bottom and the anode on top, the metal-air battery 10 is shown with the cathode on top and the anode on bottom to allow a better view of the air moving mechanism. Furthermore, references to upper, lower, horizontal, vertical, etc. are used to define a relative frame of reference and are not meant to limit the embodiments described to any particular orientation. Contained within the lower battery case section 12 are four metal-air cells 14a–d. The configuration of the cells within the case section 12 may be seen in the plan view of FIG. 4. As best shown in FIG. 3, these metal-air cells contain anode material in the form of a paste or gel 15 which is a mixture of metal particles or powder, such as zinc, and an electrolyte, such as potassium hydroxide. The anode material 15 is located along the bottom of the lower battery case 12. A separator 17 separates the anode material from an air cathode 18 which is supported by a cathode support 16. Above the air cathode 18 is located a gas-permeable, hydrophobic membrane 19 to inhibit electrolyte leakage and/or moisture from exiting the cell while allowing air to pass through for reaction at the cathode 18. A perforated mask 20 regulates the passage of air to the air cathode 18. Suitable components for primary metal-air cells are described in U.S. Pat. No. 5,378,562. Secondary cells, such as that described in U.S. Pat. No. 5,569,551, also can be used with an air mover embodying the present invention. All types of metal-air cells may benefit by use of the present invention.

An air plenum 11 defined between the upper battery case section 13 and the mask 20 contains an air mover assembly 21. In the preferred embodiment shown in FIGS. 1—3, the air mover assembly 21 consists of a rigid plate 22 connected to a deformable wall or bellows 23 allowing the rigid plate 22 to travel toward and away from the air cathode 18. The deformable wall or bellows 23 is adhered onto an annular surface 26 surrounding the top edge of the lower battery case section 12 along a sealed edge 25. The rigid plate 22 and the deformable wall 23 create a sealed enclosure which encloses the perforated portion of the mask 20 and isolates the air cathode 18 from ambient air except through one or more diffusion limiting tubes 27. The air diffusion limiting tubes 27 extend from within the air mover assembly 21, through either the rigid plate 22 or the deformable wall 23, and through an opening 28 in the upper battery case section 13 to create a passageway for ambient air to flow into and out of the air mover assembly 21 during operation of the metal-air battery 10.

The rigid plate 22 travels toward and away from the air cathode 18 as described below. The deformable wall 23 is confined by the sides of the upper battery case section 13 or a retaining structure (not shown). As a result, outward deformation of the deformable wall 23 is prevented as the rigid plate 22 travels toward the air cathode 18. The volume within the enclosure of the air mover assembly 21 decreases as the rigid plate 22 travels toward the air cathode 18 and increases as the rigid plate 22 travels away from the air cathode 18. Air flows through the diffusion limiting tubes 27 and into the air mover assembly 21 as the volume increases and air flows through the diffusion limiting tubes 27 and out of the air mover assembly 21 as the volume decreases, thus circulating a flow of air including fresh make-up air over the surface of the air cathode 18 during battery operation. The diffusion limiting tubes 27 are configured such that only small amounts of air can diffuse into or out of the air mover assembly 21 while the battery is not operating and the volume of the air mover assembly 21 is static, thus protecting the metal-air battery from rapid drying out or flooding.

Figure 2:
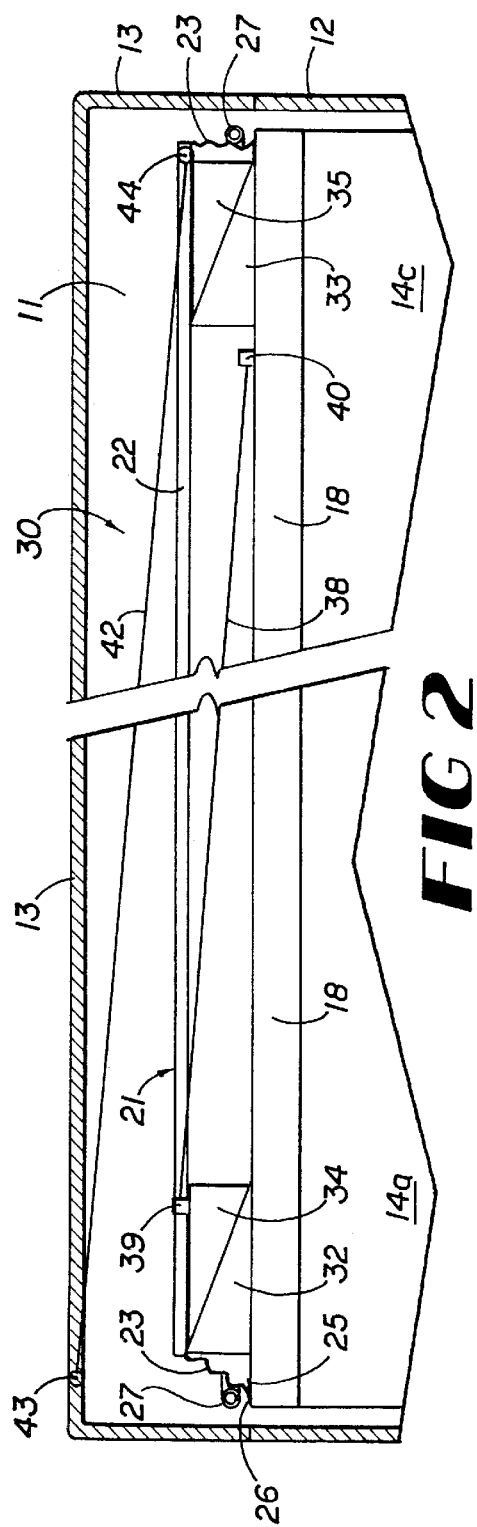
FIG. 2 is a side cross sectional view taken along line 2—2 of FIG. 1.

The movement of the rigid plate 22 toward and away from the air cathode 18 is created by an expansion/contraction mechanism 30 which is shown in FIG. 2. The expansion/contraction mechanism 30 comprises a set of two cam blocks 32 and 33, each located at an opposite side of the annular surface 26 surrounding the top edge of the lower battery case section 12. These cam blocks 32 and 33 provide inclined cam surfaces upon which two cam followers 34 and 35, attached to the lower side of the rigid plate 22 directly over the cam blocks 32 and 33, travel, thus transposing the horizontal movement of the cam followers 34 and 35 along the cam blocks 32 and 33 into vertical movement of the rigid plate 22.

A contraction line 38 is attached to an edge of the rigid plate 22 by a pin or screw at a location identified as 39, and extends to the cam block 33 located below the opposite edge of the rigid plate 22 where it is attached by a pin or screw at a location identified as 40. An expansion line 42 is attached to the upper battery case section 13 by a pin or screw at a location identified as 43 and extends to an opposite edge of the rigid plate 22 where it is attached by a pin or screw at a location identified as 44.

In the embodiment shown in FIG. 2, the contraction line 38 and the expansion line 42 are shape memory alloy wires. By shape memory alloy wire, we mean a wire, for example, nitinol alloy, with nearly equal atomic amounts of nickel and titanium, that is made to "remember" a particular shape. Such a shape memory alloy wire is formed at low temperatures to the desired shape, clamped, and then heated past its transformation temperature to its annealed temperature. When cooled, the shape memory alloy wire can be easily deformed. Thereafter, the wire will return to its annealed shape when heated. After the heat source is removed, the wire can be forced back to its deformed shape and the cycle can be repeated. A shape memory alloy wire can thus provide mechanical movement without the use of a traditional motor. A preferred shape memory alloy is sold by Dynalloy, Inc. or Erin., California under the trademark "Flexinol" actuator wires.

The wires 38 and 42 may, for example, by contracted and expanded once per second. Such a one hertz cycle time using Flexinol 025 wire three inches long would result in a power drain from the cells of less than 0.05 watts per cycle to heat each wire. Given that current need be applied for less than half the cycle, the average power is less than three per cent of the battery's power and energy in a typical configuration. To speed up both heating and cooling of the shape memory wires, they may be fed through a small rubber tube. The rubber tube insulates during heating by current flow through the wires, and increases the surface area to radiate heat away more rapidly during cooling.

It should be noted, however, that rather than being shape memory alloy wires, the contraction line 38 and the expansion line 42 can also be attached to winches that reel in the lines thus reducing the effective length of the lines rather than actually causing the lines to contract. Such a system is described below in connection with the embodiment of FIG. 9. Also, movement of the rigid plate 22 away from the air cathode 18 can be accomplished by positioning one or more spring members between the air cathode 18 and the rigid plate 22.

In the embodiment using shape memory wires, the contraction line 38 and the expansion line 42 are formed so that they contract when heated. Therefore, when the contraction line 38 is heated, it returns to its non-deformed or annealed shape and the rigid plate 22 is pulled toward the air cathode 18, thus reducing the volume of the air mover assembly 21 while also stretching the expansion line 42. Then, after the contraction line 38 has cooled, the expansion line 42 is heated thus causing it to return to its non-deformed or annealed shape and pull the rigid plate 22 away from the air cathode 18 thus increasing the volume of the air mover assembly 21 while also stretching the contraction line 38 back to its original or deformed length. After the expansion line 42 has cooled, the cycle is repeated, thus causing the rigid plate 22 to alternately move toward and away from the air cathode 18.

The shape memory alloy wires are heated by selectively directing an electric current through the wires, powered by the cells 14. The direction and timing of electric current through the wires is controlled by a control circuit (a programmed microprocessor or programmed logic controller) in a printed circuit board (PCB) 50.

As shown in FIG. 4, each metal air cell 14a–d has a positive cell terminal 47a–d, respectively, and a negative cell terminal 48a–d, respectively. The positive cell terminals 47b–d are connected to adjacent negative cell terminals 48b–d by cell interconnecting wires 49 to create a negative battery terminal 47a and a positive battery terminal 48a. The control PCB 50 is wired to the negative battery terminal 47a and the positive battery terminal 48b.

As illustrated in FIG. 5, electrical leads 51 and 52 from the control PCB 50 are attached to the contraction line 38 at electrical connections 39 and 40, respectively, in a conventional manner. Likewise, electrical leads 53 and 54 from the control PCB 50 are attached to the expansion line 42 at electrical connections 43 and 44, respectively, in a conventional manner.

In operation, the metal-air battery 10 is inserted into an electronic device such as a cellular phone or a laptop computer. When this electronic device is turned on, current is sensed by a conventional sensor in the control PCB 50, which then cycles current through the leads 51, 52, 53 and 54, and the connected shape memory wires 38 and 42. The resistance of the wires heats the wires in response to the current, causing them to contract in a sequence determined by the programming of the control circuit.

Figure 15:
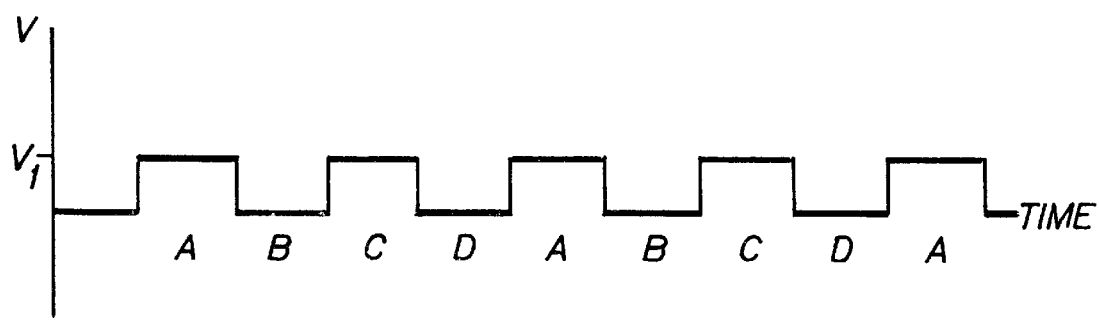
FIG. 15 is a timing diagram illustrating the voltage applied to the shape memory wires of FIGS. 1–3.

A circuit timing diagram is shown in FIG. 15 which illustrates the sequence and timing of the voltage applied to the shape memory wires 38 and 42. First, a voltage V1 between about 0 to 5 volts is applied to the contraction line 38 for an interval A of about 0.1 to 5 seconds, thus causing the contraction line 38 to contract while also stretching the expansion line 42. Next, the contraction 38 is allowed to cool for an interval B of about 0.1 to 5 seconds before the voltage V1 is applied to the expansion line 42 for an interval C of about 0.1 to 5 seconds, thus causing the expansion line 42 to contract while also stretching the contraction line 38. Finally, the expansion line 42 is allowed to cool for an interval D of about 0.1 to 5 seconds in addition to any necessary delay time (D represents cooling plus delay time) before the entire sequence is repeated. A delay in addition to the time required for cooling the expansion line 42 may be desirable to limit the frequency of the contraction and expansion cycle in order to control or limit the amount of air that is circulated over the surface of the air cathode 18 during operation of the metal-air battery 10. This technique minimizes the amount of water vapor exchanged with the outside air. As an example, A+B+C+D preferably will total about 2 seconds.

It should be understood that the voltage level and intervals described above can be varied to optimize the performance of particular metal-air cells. Also, the control PCB 50 can be programmed to move air into the plenum occasionally while the cell is inactive or in storage, to maintain an open cell voltage sufficient to allow rapid starting of the cell when a load is applied.

Thus, the lines 38 and 42 provide a linear actuator that indirectly causes motion of the plate 22 toward and away from the air cathode 18. Those skilled in the art will further understand that a direct linear actuator could be utilized, for example: lines extending directly from the plate to the cathode frame, or solenoid or pneumatically operated rods movable perpendicular to the plane of the plate 22.

Figure 7:
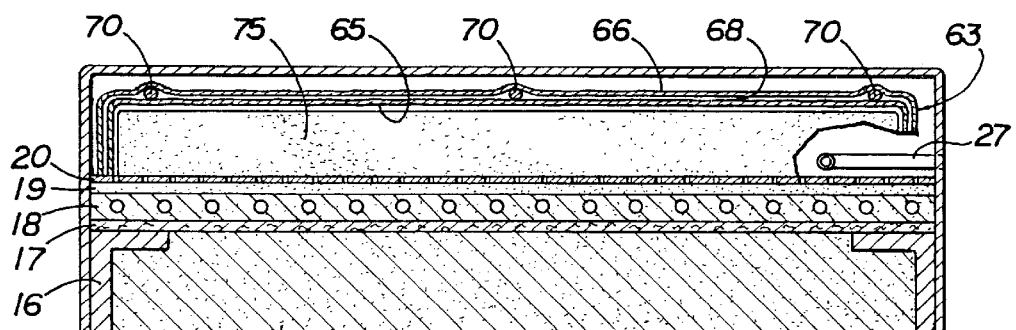
FIG. 7 is a side cross sectional view taken along line 7—7 of FIG. 6.
Figure 8:
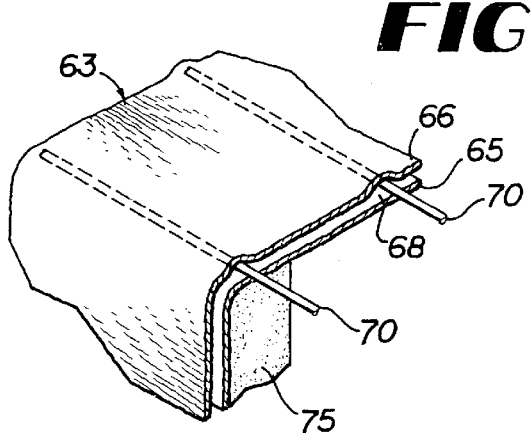
FIG. 8 is a fragmentary pictorial view of a portion of the air mover of FIG. 6, showing the laminated construction of the enclosure bag.

A further embodiment of the present invention is shown in FIGS. 6, 7, and 8. In this embodiment, an air mover assembly 60 provides a flexible bag 63 contained within the air plenum 11 which creates a sealed enclosure over the perforated mask 20 thus isolating the air cathode 18 from ambient air except through one or more diffusion limiting tubes 27. The bag 63 preferably is a two-ply material, best shown in FIG. 8, having an inner ply 65 and an outer ply 66 laminated together except where they define elongated passageways 68 therebetween.

In this embodiment, three passageways 68 are formed between the plies 65 and 66 of the bag 63. Note, however, that there could be fewer than or more than three passageways. These passageways are unlaminated and extend along the ends and length of the bag 63 and are spaced apart along the width of the upper battery case section 13. One passageway is positioned at the approximate middle of the case, and the others are adjacent to either side. Each passageway includes a shape memory alloy wire 70 and in FIG. 6, the locations of the passageways are indicated by the shape memory alloy wires 70. Electrical leads 71 are attached to all three shape memory wires 70 in a conventional manner to connect the three wires 70 in parallel. The leads 71 extends to a control PCB 73.

The flexible bag 63 and the deformable wall or bellows 23 are made from material, such as a metallized fabric or polymer, that is lightweight and essentially airtight. The material is also strong enough to prevent tearing of the flexible bag 63 during repeated expansion and contraction of the air mover assembly 21.

The shape memory wires 70 preferably receive current from the cells 14, when connected by the control circuit in the PCB 73, to contract approximately simultaneously and uniformly thus collapsing the bag 63. Furthermore, alternative means can be provided for reducing the volume of the bag 63, such as lines operative to pull the bag 63 toward the air cathode 18. Foam pads 75 located at each end of the upper battery case section 13 are contained within the bag 63 and provide a spring action to return the bag 63 to its expanded shape when the shape memory alloy wires 70 relax. The system could utilize alternative devices for returning the bag to its expanded configuration including other springs or spring-like material, or devices such as lines operative to pull the bag 63 toward the upper battery case section 13. A timing sequence similar to that of FIG. 15 can be used for this embodiment, modified to omit the commands needed for operation of the expansion wires 42.

Figure 9:
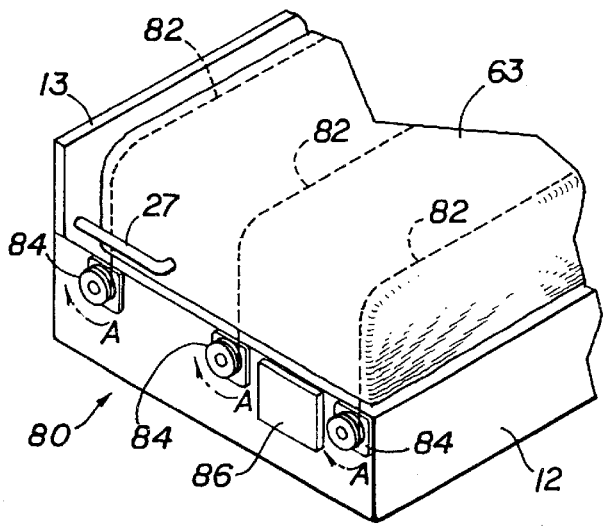
FIG. 9 is a partial pictorial view of an alternative actuator for the enclosure of FIG. 6.

A further modified air moving device 80 embodying the present invention is shown in FIG. 9. In this embodiment, each passageway 68 of the flexible bag 63 contains a wire 82 that is attached to a winch 84 mounted at one end of the lower battery case 12. These winches 84 are wired to a control circuit 86 which controls the operation of the winches 84 so that the winches 84 reel in the wires 82 approximately simultaneously and uniformly, thus reducing an effective length of the wires 82 and collapsing the bag 63 against the force of the spring member 75. A single winch could be used to draw in all three wires 82. When the winches 84 are relaxed, the spring member 75 unwinds the wires 82 and returns the bag 63 to its expanded configuration.

Figure 10:
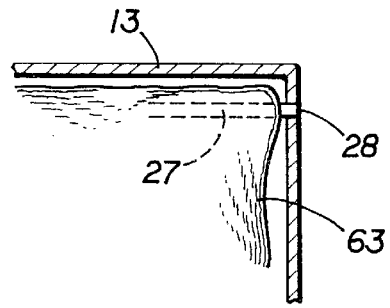
FIG. 10 is a diagrammatic view of one arrangement of a diffusion limiting tube with respect to a bag enclosure.
Figure 11:
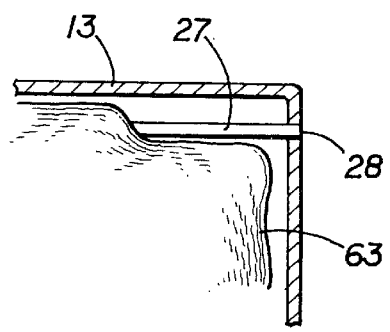
FIG. 11 is a diagrammatic view of another arrangement of a diffusion limiting tube with respect to a bag enclosure.

Alternate embodiments of the diffusion limiting tube 27 in relation to the flexible bag 63 are shown in FIGS. 10 and 11. In FIG. 10, the diffusion limiting tube 27 extends from within the flexible bag 63, through an opening in the bag and to an opening 28 in the upper battery case section 13. In this embodiment, the flexible bag 63 is sealed to the outer diameter of the diffusion limiting tube 27 intermediate the ends of the tube. In FIG. 11, the flexible bag 63 is shaped such that the diffusion limiting tube 27 extends from the surface of the flexible bag 63 at an opening in the bag, and to the opening 28 in the upper battery case section 13. In this embodiment, the flexible bag 63 is sealed to the end of the diffusion limiting tube 27.

An advantage of a metal-air battery that utilizes any of these embodiments of an air mover according to the present invention is that the air-mover assembly occupies the air plenum adjacent to the air cathode, thus eliminating the need for a separate space for the air-moving device and increasing the percentage of battery volume that can be used for the anode and cathode components.

Figure 14:
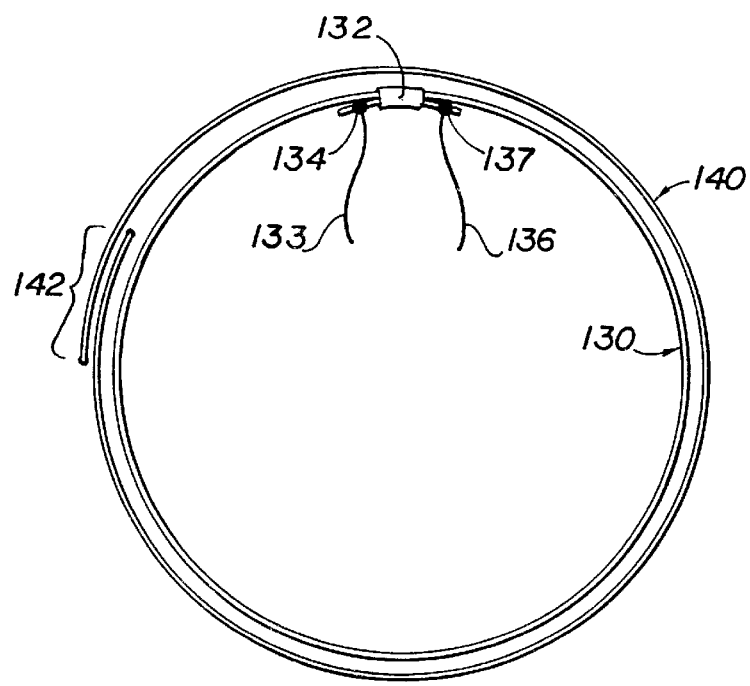
FIG. 14 is a diagrammatic view of a shape memory alloy ring and return spring as configured within a passageway formed within an enclosure bag of the embodiment of FIGS. 12 and 13.

This advantage is also present in a cylindrical metal-air cell 100 embodying the present invention as shown in FIGS. 12–14. As in the earlier embodiments, an air moving mechanism is located in the space required for an air electrode plenum.

The cylindrical cell 100 is principally contained within a cylindrical case body or can 105. The can 105 preferably is made of a conductive metal similar to the anode can of conventional button cells. The can 105 includes a cylindrical case wall 106 enclosed at one end by a case bottom 107. An anode current collector spike 108 extends into the case body 105 along its longitudinal axis from the case bottom 107. The outer surface of the case wall 106 may be coated with or surrounded by an insulating layer, so that the case bottom 107 provides the anode terminal for connection to a load.

A cylindrical air cathode 112 fits between the current collector spike 108 and the case wall 106. A cylindrical perforated mask 114, for example of the type shown in U.S. Pat. No. 5,328,777, surrounds the air cathode to regulate passage of air to the cathode from an air plenum 115 defined between the mask 114 and the case wall 106. If desired, an air permeable, liquid impermeable membrane (not shown) may be installed between the air cathode 112 and the mask 114. The cathode may be of known construction, such as shown in U.S. Pat. No. 5,378,562, and includes a current collector screen (not shown) embedded in the cathode material. The cathode also may have the novel structure described in pending U.S. patent application Ser. No. 60/063,156 which is entitled "Primary Metal-Air Power Source and Ventilation System for the Same," filed Oct. 23, 1998, and incorporated herein by reference.

A cylindrical separator (not shown) is positioned in a conventional manner adjacent to the inner side of the air cathode, and a mixture of metal particles or powder, such as zinc, and an electrolyte, such as potassium hydroxide, in the form of a paste or gel 116, fills the space between the separator and the current collector spike 108. In a conventional manner, ions of the electrolyte can move to the air cathode, and the anode paste or gel is in electrical contact with the anode current collector 108.

The entire air cathode 112 and the anode gel 116 are surrounded by a flexible bag 120. The bag 120 preferably is a two-ply material, having an outer ply 123 and an inner ply 124 laminated together except where they define elongate passageways therebetween, similar to the material described above in connection with FIG. 8. The bag 120 has a cylindrical bag wall 122 within the cathode plenum 115, a bag bottom 126, and a gathered bag top 128. The bag bottom 126 lies between the case contents and the case bottom 107. A central opening 127 is formed in the bag bottom to closely fit over the anode current collector spike 108. Optionally, the bag bottom 126 may be sealed by an adhesive around the opening 127. The bag top 128 preferably is gathered over the contents of the case body 105 and sealed at point 129, at about the central axis of the cell 100.

Alternative enclosure structures can be utilized. For example, the bag wall 122 can be replaced by a stiff sheet of material, preferably plastic, bent into a circle with overlapping longitudinal edges that allow the diameter to change. In this case, the sheet would be connected to the periphery of the air cathode by a deformable wall.

In the embodiment shown, three passageways 125 are formed between the plies 123 and 124 of the bag 120. These passageways are unlaminated circles extending around the bag wall 122 and spaced apart along the height of the case body 105, one passageway being at the approximate center of the case, and the others being adjacent to its top and bottom. In FIG. 13, the locations of the passageways are indicated by their contents, a pair of generally circular wires. Each passageway includes a shape memory alloy loop 130 and a return spring loop 140, as shown in FIG. 14. Each shape memory loop 130 includes an insulating joint at a mechanical connector 132, preferably a crimp. Electrical leads 133 and 136 are attached to all three shape memory loops 130 at electrical connections 134 and 137, respectively, in a conventional manner. Thus, the three loops and connected in parallel. Preferably, the leads exit the outer ply 123 near each connection 134, 137 and extend along the outside of the bag 120. This permits the inner ply 124 to remain unbroken at the passageways 125. The lead 136 extends to a terminal 138 which is pressed into electrical contact with the conductive case bottom 107 of the anode can. The lead 133 extends upwardly to a control circuit described below.

The shape memory wires 130 preferably are electrified to contract approximately simultaneously and uniformly. In an alternative arrangements, the two loops 130 can be anchored at one end and contracted in opposite directions to create a wringing deformation of the bag 120 to reduce its volume. Furthermore, alternative means can be provided for reducing the volume of the bag 120, such as lines operative to pull the bag toward the air cathode. Those skilled in the art will understand that an appropriate timing sequence can be selected similar to that discussed above in connection with FIG. 15.

Each return spring loop 140 extends in a circle with overlapping, loose ends as shown at 142, and lies freely within its passageway 125. The loose ends are rounded to avoid catching on the fabric of the plies 123 and 124. As the adjacent shape memory alloy 130 contracts upon the application of electrical current thereto, reduction in the diameter of the passageway causes the return spring loop 140 sharing the same passageway 125 to flex. The loose ends of the return spring move farther past one another within the passageway to shrink the diameter of the loop 140 and build up tension in the loop 140. The spring 140 then is ready to return the bag 120 to its expanded shape when the shape memory loop 130 relaxes. It should be noted that alternative devices for returning the bag to its expanded configuration can be utilized. For example, foam pads or annular rings or other radially acting spring members could be positioned inside the bag 120, similar to those shown in FIG. 6. Also, the bag could be pulled out by lines in a manner described above in connection with previous embodiments.

A circular partition 148 is positioned across the case body 106 spaced a short distance inwardly from the upper end of the case body. The partition 148 confines the bag 120 to the cathode plenum 115 so that the volume of the bag is forced to expand and contract under the influence of the shape memory loops 130. A printed circuit board 150 is mounted on the partition 148. Or, in the alternative, the partition 148 can be a printed circuit board. The cathode current collector (not shown) is wired to the printed circuit board 150, which in turn can selectively complete a circuit between the cathode 112 and a load terminal 155 mounted outside a case top 154. The terminal 155 is insulated from the anode can 106. The lead 133 from the shape memory loops 130 is also connected to the control circuit of the printed circuit board 150.

A diffusion limiting tube or isolation tube 144 is attached in an essentially air tight manner to the bag 120 at an opening 145 in the bag. The tube 144 extends upward through an opening 152 in the partition 148 and to an opening 157 in the case top 154. The opening 157 forms an essentially air tight seal around the outside diameter of the tube 144. Thus, the only air connection between the interior of the bag 120 and the ambient environment around the cell 100 is through the tube 144. Multiple tubes 144 can be utilized if desired. For example, another tube can be connected to provide air adjacent to the bottom of the air cathode, or tubes can be spaced around the circumference of the bag to uniformly distribute air to the cathode.

Assembly of the cell shown in FIGS. 12–14 may advantageously proceed as follows. A bag 120 as shown in FIG. 13 may be inserted down into the cell case body 105 with anode current collector 108 inserted up through the opening 127. When the bag bottom 126 is flush against the case bottom 107 with the terminal 138 in contact with the metal case bottom, the bag can be sealed to the case around the opening 127 with adhesive or the like. Next, an assembly of the air cathode 112, mask 114 and separator can be dropped into the bag and centered (for example using centering projections, not shown, extending from the floor 107 of the case). Then the annular cavity between the cathode and the current collector may be filled with the anode paste 116, and the bag can be gathered above its contents and sealed at point 129 by welding, crimping, or adhesive. The partition 148 is installed with the tube 144 extending through the opening 152, and with a lead from the cathode current collector and the lead 133 from the shape memory loops extending through or around the partition and being connected to the control circuit board 150. Finally, the circuit is connected to load terminal 155 and the case top 154 is installed and glued or welded to the case body 106.

The result is a cylindrical cell that can have a standard size, such as AA, C, or D. An advantage of this cylindrical cell is that space at the top of the cylinder is needed only for the electronics, not for an air moving device. A large proportion of the cylindrical volume, in excess of about 70%, can be used for the anode and cathode components. Also, the power output of the battery can be high because of the large cylindrical air cathode area, as compared to a cylindrical cell in which the air cathode is placed across the cell perpendicular to the longitudinal axis of the cylinder. Such a cell in a D size should be able to produce a steady state output of at least 1.25 to 2.5 watts, and provide an energy output of at least 30 watt-hours.

In operation, the cell 100 is placed into a battery compartment of an electronic device, just as a standard alkaline battery would be inserted. When the device is off, the tube 144 isolates the cell and protects it from rapid drying out or flooding. When the device is turned on, a current will begin to flow in the external circuit connecting the terminal 155 and the metal can bottom 107 as a result of the open cell voltage in the cell 100. This current can be sensed by a conventional sensor in the circuit board 150, which then will begin to cycle current through the leads 133, 136, and the connected shape memory loops 130. Upon heating to a predetermined level, the shape memory alloy contracts, causing the loops 130 to pull the bag wall 122 toward the air cathode. The ends of the bag are confined by the case bottom 107 and the partition 148, so the movement of the bag wall forces air out through the tube 144. When the current pulse ends, the loops 130 cool, allowing the return springs 140 to expand the loops 130 and return the bag wall 122 to its expanded position, sucking air in through the tube 144. As the bag alternately expands and contracts, new air containing reactive oxygen is intermittently pulled into the cathode air plenum. The cycles may continue until the load is removed from the cell.

While supplying current to a load, the frequency of the current pulses to the shape memory loops 130 may be varied depending on the power demand of the load. This technique minimizes the amount of water vapor (or dry air) introduced into the cell. If desired, the circuit 150 can by programmed to cycle the bag 120 to move air into the plenum while the cell is inactive or in storage, to maintain an open cell voltage sufficient to allow rapid starting of the cell when a load is applied as described above.

Referring in detail to the isolating passageways described above, these isolating passageways are preferably constructed and arranged to allow a sufficient amount of airflow therethrough while the air moving device is operating so that a sufficient output current, typically at least 50 ma, and preferably at least 130 ma can be obtained from the metal-air cells. In addition, the isolating passageways are preferably constructed to limit the airflow and diffusion therethrough such that the drain current that the metal-air cells are capable of providing to a load while the air moving device is not forcing airflow through the isolating passageways is smaller than the output current by a factor of about 50 or greater. In addition, the isolating passageways are preferably constructed to provide an "isolation ratio" of more than 50 to 1.

The "isolation ratio" is the ratio of the rate of water loss or gain by a cell while its oxygen electrodes are fully exposed to the ambient air, as compared to the rate of the water loss or gain of the cell while its oxygen electrodes are isolated from the ambient air, except through one or more limited openings. For example, given identical metal-air cells having electrolyte solutions of approximately thirty-five percent (35%) KOH in water, an internal relative humidity of approximately fifty percent (50%), the ambient air having a relative humidity of approximately ten percent (10%), and no fan-forced circulation, the water loss from a cell having an oxygen electrode fully exposed to the ambient air should be more than 100 times greater than the water loss from a cell having an oxygen electrode that is isolated from the ambient air, except through one or more isolating passageways of the type described above. In this example, an isolation ratio of more than 100 to 1 should be obtained.

More specifically, each of the isolating passageways preferably has a width that is generally perpendicular to the direction of flow therethrough, and a length that is generally parallel to the direction of flow therethrough. The length and the width are selected to substantially eliminate airflow and diffusion through the isolating passageways while the air moving device is not forcing airflow through the isolating passageways. The length is greater than the width, and more preferably the length is greater than about twice the width. The use of larger ratios between length and width are preferred. Depending upon the nature of the metal-air cells, the ratio can be more than 200 to 1. However, the preferred ratio of length to width is about 10 to 1.

The isolating passageways could form only a portion of the path air must take between the ambient environment and the oxygen electrodes. Each of the isolating passageways may be defined through the thickness of the battery housing or cell case, but preferably they are in the form of tubes as described above. In either case, the isolating passageways may be cylindrical, and for some applications each can have a length of about 0.3 to 2.5 inches or longer, with about 0.88 to 1.0 inches preferred, and an inside diameter of about 0.03 to 0.3 inches, with about 0.09 to 0.19 inches preferred. The total open area of each isolating passageway for such applications, measured perpendicular to the direction of flow therethrough, is therefore about 0.0007 to 0.5 square inches. In other applications, such as small cylindrical cells, the isolating passageways each can have a length of about 0.1 to 0.3 inches or longer, with about 0.1 to 0.2 inches preferred, and an inside diameter of about 0.01 to 0.05 inches, with about 0.015 inches preferred. The preferred dimensions for a particular application will be related to the geometry of the passageways and the cathode plenums, the particular air mover utilized, and the volume or air needed to operate the cells at a desired level.

The isolating passageways are not necessarily cylindrical, as any cross-sectional shape that provides the desired isolation is suitable. The isolating passageways need not be uniform along their length, so long as at least a portion of each isolating passageway is operative to provided the desired isolation. Further, the isolating passageways may be straight or curved along their length.

Other exemplary isolating passageways and systems are disclosed in U.S. Pat. No. 5,691,074 and U.S. Application No. 08/556,613, now U.S. No. Pat. 5,919,582 and the entire disclosure of each of those documents is incorporated herein by reference.

The diffusion limiting passageways 27 and 144 described above preferably serve as both inlet and outlet for the cell or cells associated with the air mover enclosures to which the passageways are connected. One, two, or several such passageways can be associated with each enclosure. However, it should be understood that a flow-through path could be created by providing flexible baffles within an air moving enclosure, and check valves to allow one passageway only to admit outside air, and another passageway only to exhaust air.

Another approach to equipping a cylindrical cell according to the present invention is to install an air moving enclosure of the type described above in connection with FIGS. 1–11 adjacent to an air cathode positioned in a radial plane within the cylindrical cell.

From the foregoing it will be seen that the present invention provides an improved air moving device for metal-air cells that has significant advantages. It occupies a minimal amount of the volume available for battery chemistry by placing the air mover within the air electrode plenum. Also, the air mover is usable with advanced systems such as diffusion limiting tubes for isolating the air electrodes when power is not being drawn from the metal air cell, and consumes a relatively low amount of power from the cells of a metal-air battery.

While this invention has been described in detail with particular reference to a preferred embodiment thereof, it will be understood that modifications and variations may be made without departing from the scope of the invention as defined in the appended claims.

What is claimed is:

1. A metal air power supply, comprising:
   a variable volume enclosure isolating one or more air electrodes from ambient air except through one or more passageways; and
   means for varying the volume of said enclosure such that air is moved into said enclosure through said one or more passageways when the volume of said enclosure is expanding and air is moved out of said enclosure through said one or more passageways when the volume of said enclosure is contracting.

2. The power supply of claim 1, wherein said one or more passageways are shaped to be operative to restrict air flow into and out of said enclosure while said passageways are unsealed and the volume of said enclosure is static.

3. The power supply of claim 1, wherein said variable volume enclosure comprises:
   a rigid plate mounted for movement toward and away from said air electrode; and
   a deformable wall extending from said rigid plate to a frame member surrounding said air electrode, so as to isolate a volume between said rigid plate and said air electrode from ambient air except through said one or more passageways.

4. The power supply of claim 1, wherein said variable volume enclosure comprises a collapsible bag mounted onto a frame member surrounding said air electrode, so as to isolate a volume within said collapsible bag from ambient air except through said one or more passageways.

5. The power supply of claim 4, wherein said means for varying the volume of said enclosure comprises means for at least partly collapsing said collapsible bag and means for alternately expanding said collapsible bag.

6. An air moving device for supplying ambient air to an air electrode of a metal air power supply, comprising:
   a variable volume enclosure for isolating said electrode from ambient air except through one or more passageways, wherein said variable volume enclosure comprises:
      a rigid plate mounted for movement toward and away from said electrode while said variable volume enclosure is isolating said electrode from ambient air except through said one or more passageways, and
      a deformable wall extending from said rigid plate to a frame member for surrounding said electrode so as to isolate a volume between said rigid plate and said electrode from ambient air except through said one or more passageways, while said variable volume enclosure is isolating said electrode from ambient air except through said one or more passageways; and
   means for varying the volume of said enclosure while said variable volume enclosure is isolating said electrode from ambient air except through said one or more passageways, such that air is moved into said enclosure through said one or more passageways when the volume of said enclosure is expanding and air is moved out of said enclosure through said one or more passageways when the volume of said enclosure is contracting, wherein said means for varying the volume of said enclosure comprises means for alternately moving said rigid plate toward said electrode and away from said electrode while said variable volume enclosure is isolating said electrode from ambient air except through said one or more passageways, and wherein said means for alternately moving said rigid plate toward said electrode and away from said electrode comprises:
      means for selectively moving said rigid plate away from said electrode while said variable volume enclosure is isolating said electrode from ambient air except through said one or more passageways;
      a first line extending between said rigid plate and a fixed member positioned below said rigid plate; and
      means for selectively pulling said rigid plate toward said fixed member using said first line.

7. The air moving device of claim 6 in combination with said metal air power supply, wherein said metal air power supply includes an outer casing extending above said rigid plate and wherein said means for selectively moving said rigid plate away from said electrode comprises:
   a second line extending between said rigid plate and said outer casing; and
   means for selectively pulling said rigid plate toward said outer casing using said second line.

8. The combination of claim 7, wherein:
   said second line comprises a shape memory alloy wire; and
   said means for selectively pulling said rigid plate toward said outer casing using said second line comprises said electrical circuit, said electric circuit being connected to said shape memory alloy wire and operative to selectively direct an electric current through said shape memory alloy wire so as to cause said shape memory alloy wire to contract.

9. The combination of claim 8, wherein:
   said first line comprises a shape memory alloy wire; and
   said means for selectively pulling said rigid plate toward said fixed member using said second line comprises said electrical circuit, said electric circuit being connected to said shape memory alloy wire and operative to selectively direct an electric current through said shape memory alloy wire so as to cause said shape memory alloy wire to contact.

10. The combination of claim 9, wherein said electric circuit draws power from said metal air power supply.

11. The combination of claim 7, wherein said means for selectively pulling said rigid plate toward said fixed member using said first line comprises a winch operative to reel in said first line so as to pull said rigid plate toward said fixed member.

12. The combination of claim 11, wherein said means for selectively pulling said rigid plate toward said outer casing using said second line comprises a second winch operative to reel in said second line so as to pull said rigid plate toward said outer casing.

13. The combination of claim 7, wherein said first line extends between said rigid plate and said fixed member with a substantial component parallel to said electrode and said means for selectively pulling said rigid plate toward said fixed member includes a cam surface and a cam follower positioned such that the movement of said rigid plate responsive to the movement of said first line is transposed into a direction substantially perpendicular to said electrode.

14. The combination of claim 13, wherein said second line extends between said rigid plate and said outer casing with a substantial component parallel to said electrode and said means for selectively pulling said rigid plate toward said outer casing includes a cam surface and a cam follower positioned such that the movement of said rigid plate responsive to the movement of said second line is transposed into a direction substantially perpendicular to said electrode.

15. The air moving device of claim 6, wherein:
said means for selectively moving said rigid plate away from said electrode comprises one or more spring members positioned between said rigid plate and said electrode operative to urge said plate away from said electrode; and
said means for selectively pulling said rigid plate toward said fixed member using said first line comprises means for selectively pulling said rigid plate from an initial position toward said fixed member against the force of said spring member using said first line.

16. The air moving device of claim 15, wherein said first line comprises a shape memory alloy wire and said means for selectively pulling said rigid plate from an initial position toward said fixed member against the force of said spring member using said first line comprises an electrical circuit, said electric circuit being connected to said shape memory alloy wire and operative to selectively direct an electric current through said shape memory alloy wire so as to cause said shape memory alloy wire to contract.

17. The air moving device of claim 15, wherein said means for selectively pulling said rigid plate from an initial position toward said fixed member against the force of said spring member using said first line comprises a winch operative to reel in said first line so as to pull said rigid plate toward said fixed member.

18. An air moving device for supplying ambient air to an air electrode of a metal air power supply, comprising:
a variable volume enclosure for isolating said electrode from ambient air except through one or more passageways, wherein said variable volume enclosure comprises:
a rigid plate mounted for movement toward and away from said electrode while said variable volume enclosure is isolating said electrode from ambient air except through said one or more passageways, and
a deformable wall extending from said rigid plate to a frame member for surrounding said electrode so as to isolate a volume between said rigid plate and said electrode from ambient air except through said one or more passageways, while said variable volume enclosure is isolating said electrode from ambient air except through said one or more passageways; and
means for varying the volume of said enclosure while said variable volume enclosure is isolating said electrode from ambient air except through said one or more passageways, such that air is moved into said enclosure through said one or more passageways when the volume of said enclosure is expanding and air is moved out of said enclosure through said one or more passageways when the volume of said enclosure is contracting, wherein said means for varying the volume of said enclosure comprises means for alternately moving said rigid plate toward said electrode and away from said electrode while said variable volume enclosure is isolating said electrode from ambient air except through said one or more passageways, and
wherein the air moving device is in combination with said metal air power supply, wherein said metal air power supply includes means for preventing outward deformation of said deformable wall such that the volume of said variable volume enclosure decreases as said rigid plate moves towards said electrode.

19. The combination of claim 18, wherein said means for preventing outward deformation of said deformable wall comprises one or more retaining structures positioned to prevent outward deformation of said deformable wall.

20. The combination claim 19, wherein said one or more retaining structures comprise walls positioned outside said variable volume enclosure.

21. A metal air power supply, comprising:
a variable volume enclosure isolating one or more air electrodes from ambient air except through one or more passageways, said enclosure comprising a rigid plate mounted for movement toward and away from said electrode while said variable volume enclosure is isolating said one or more air electrodes from ambient air except through one or more passageways, and a deformable wall extending from said rigid plate to a frame member for surrounding said electrode; and
a linear actuator connected to said plate and operative to move said plate to vary the volume of said enclosure while said variable volume enclosure is isolating said one or more air electrodes from ambient air except through said one or more passageways, such that air is moved into said enclosure through said one or more passageways when the volume of said enclosure is expanding and air is moved out of said enclosure through said one or more passageways when the volume of said enclosure is contracting, wherein said linear actuator is powered by electrical current from one or more cells of the power supply.

22. A cylindrical metal-air power supply, comprising:
a cylindrical air cathode;
an anode and electrolyte positioned within said cathode;
an enclosure around said air cathode, isolating said cathode from ambient air except through an air conduit; and
means for alternately contracting and expanding the volume of said enclosure to move air in and out of said enclosure through said air conduit.

23. A cylindrical metal-air power supply, comprising:
a conductive cylindrical case body including a cylindrical case wall, a case bottom, and an anode current collector extending into said case body from said case bottom;
a mixture of anode metal and electrolyte within said case body in contact with said anode current collector;
an air cathode positioned around said mixture and spaced inwardly from an inner surface of said cylindrical case wall, a cylindrical cathode air plenum being formed inside said cylindrical case wall;
a case cover including a terminal electrically connected to a cathode current collector of said air cathode and insulated from said conductive case body;
an enclosure within said cathode air plenum around said air cathode;
an air conduit connecting the interior of said enclosure to the atmosphere outside said case; and
means for alternately contracting and expanding the volume of said enclosure within said cathode air plenum to move air in and out of said enclosure through said air conduit.

24. A cylindrical metal-air power supply, comprising:
a conductive cylindrical case body including a cylindrical case wall, a case bottom, and an anode current collector extending into said case body from said case bottom;
a mixture of anode metal and electrolyte within said case body in contact with said anode current collector;
an air cathode positioned around said mixture and spaced inwardly from an inner surface of said cylindrical case wall, a cylindrical cathode air plenum being formed inside said cylindrical case wall;

a case cover including a terminal electrically connected to a cathode current collector of said air cathode and insulated from said conductive case body;

a collapsible bag positioned within said cathode air plenum around said air cathode;

an air conduit connecting the interior of said bag and the atmosphere outside said case; and means for alternately contracting and expanding said bag within said cathode air plenum to move air in and out of said bag through said air conduit.

25. The metal-air power supply of claim 24, further comprising additional said air conduits between the interior of said bag and the atmosphere outside said case.

26. The metal-air power supply of claim 24, wherein said air conduit comprises a diffusion limiting passageway.

27. The metal-air power supply of claim 24, wherein said means for alternately contracting and expanding said bag comprises:

one or more lines engaging said bag;

means for reducing an initial effective length of said lines to collapse said bag from an initial volume to a smaller volume; and means for returning said bag to said initial volume.

28. The metal-air power supply of claim 27, wherein said means for returning said bag to said initial volume comprises one or more spring members.

29. The metal-air power supply of claim 28, wherein said one or more lines comprise shape memory alloy wires, and said means for reducing an initial effective length of said lines comprises an electrical circuit connected to supply current through said wires.

30. The metal-air power supply of claim 28, wherein said means for reducing an initial effective length of said lines comprises a winch including a reel operative for winding up said lines.

31. The metal-air power supply of claim 27, wherein said lines comprise a plurality of shape memory wires retained to said bag;

said means for reducing an initial effective length of said lines comprises an electrical circuit connected to supply current through said wires to shrink an initial diameter thereof; and said means for returning said bag to said initial volume comprises a plurality of arcuate wire springs retained to said bag.

32. The metal-air power supply of claim 31, wherein said bag comprises a two-ply material defining passageways in which said shape memory alloy wires and said wire springs are captured, said wires and springs moving longitudinally within said passageways.

33. The metal-air power supply of claim 24, wherein said bag extends from an essentially sealed connection to said case body at a base of said anode current collector to cover said air cathode and anode mixture beneath said case cover.

34. A metal air power supply, comprising:

a variable volume enclosure for isolating one or more air electrodes from ambient air except through one or more passageways, wherein said variable volume enclosure comprises:

a rigid plate mounted for movement toward and away from said one or more air electrodes while said variable volume enclosure is isolating said one or more air electrodes from ambient air except through said one or more passageways, wherein said one or more passageways extend through said rigid plate, and a deformable wall extending from said rigid plate to a frame member for surrounding said one or more air electrodes so as to isolate a volume between said rigid plate and said one or more air electrodes from ambient air except through said one or more passageways, while said variable volume enclosure is isolating said one or more air electrodes from ambient air except through said one or more passageways; and means for varying the volume of said enclosure while said variable volume enclosure is isolating said one or more air electrodes from ambient air except through said one or more passageways, such that air is moved into said enclosure through said one or more passageways when the volume of said enclosure is expanding and air is moved out of said enclosure through said one or more passageways when the volume of said enclosure is contracting, wherein said means for varying the volume of said enclosure is powered by electrical current from one or more cells of the power supply.

35. A metal air power supply, comprising:

a variable volume enclosure for isolating one or more air electrodes from ambient air except through one or more passageways, wherein said variable volume enclosure comprises:

a rigid plate mounted for movement toward and away from said one or more air electrodes while said variable volume enclosure is isolating said one or more air electrodes from ambient air except through said one or more passageways, and a deformable wall extending from said rigid plate to a frame member for surrounding said one or more air electrodes so as to isolate a volume between said rigid plate and said one or more air electrodes from ambient air except through said one or more passageways, while said variable volume enclosure is isolating said one or more air electrodes from ambient air except through said one or more passageways, wherein said one or more passageways extend through said deformable wall; and means for varying the volume of said enclosure while said variable volume enclosure is isolating said one or more air electrodes from ambient air except through said one or more passageways, such that air is moved into said enclosure through said one or more passageways when the volume of said enclosure is expanding and air is moved out of said enclosure through said one or more passageways when the volume of said enclosure is contracting, wherein said means for varying the volume of said enclosure is powered by electrical current from one or more cells of the power supply.

36. A metal air power supply, comprising:

a variable volume enclosure for isolating one or more air electrodes from ambient air except through one or more passageways, wherein said variable volume enclosure comprises:

a rigid plate mounted for movement toward and away from said one or more air electrodes while said variable volume enclosure is isolating said one or more air electrodes from ambient air except through said one or more passageways, and a deformable wall extending from said rigid plate to a frame member for surrounding said one or more air electrodes so as to isolate a volume between said rigid plate and said one or more air electrodes from ambient air except through said one or more passageways, while said variable volume enclosure is isolating said one or more air electrodes from ambient air except through said one or more passageways; and means for varying the volume of said enclosure while said variable volume enclosure is isolating said one or more air electrodes from ambient air except through said one or more passageways, such that air is moved into said enclosure through said one or more passageways when the volume of said enclosure is expanding and air is moved out of said enclosure through said one or more passageways when the volume of said enclosure is contracting, wherein said means for varying the volume of said enclosure comprises means for alternately moving said rigid plate toward said one or more air electrodes and away from said one or more air electrodes while said variable volume enclosure is isolating said one or more air electrodes from ambient air except through said one or more passageways, wherein said means for varying the volume of said enclosure is powered by electrical current from one or more cells of the power supply.

37. A metal air power supply, comprising:

a variable volume enclosure isolating one or more air electrodes from ambient air except through one or more passageways, wherein said variable volume enclosure comprises a collapsible bag mounted onto a frame member for surrounding said electrode while said variable volume enclosure is isolating said electrode from ambient air except through said one or more passageways, so as to isolate a volume within said collapsible bag from ambient air except through said one or more passageways, and wherein said one or more passageways extend through said collapsible bag; and means for varying the volume of said enclosure while said variable volume enclosure is isolating said one or more air electrodes from ambient air except through said one or more passageways, such that air is moved into said enclosure through said one or more passageways when the volume of said enclosure is expanding and air is moved out of said enclosure through said one or more passageways when the volume of said enclosure is contracting.

38. An air moving device for supplying ambient air to an air electrode of a metal air power supply, comprising:

a variable volume enclosure for isolating said electrode from ambient air except through one or more passageways, wherein said variable volume enclosure comprises a collapsible bag mounted onto a frame member for surrounding said electrode while said variable volume enclosure is isolating said electrode from ambient air except through said one or more passageways, so as to isolate a volume within said collapsible bag from ambient air except through said one or more passageways; and means for varying the volume of said enclosure while said variable volume enclosure is isolating said electrode from ambient air except through said one or more passageways, such that air is moved into said enclosure through said one or more passageways when the volume of said enclosure is expanding and air is moved out of said enclosure through said one or more passageways when the volume of said enclosure is contracting, wherein said means for varying the volume of said enclosure comprises means for at least partly collapsing said collapsible bag and means for alternately expanding said collapsible bag, and wherein said means for at least partly collapsing said collapsible bag comprises:

one or more first lines engaging said collapsible bag, and means for selectively shortening an effective length of said first line or lines.

39. The air moving device of claim 38, wherein said means for alternately expanding said collapsible bag comprises:

one or more second lines engaging said collapsible bag; and means for selectively shortening an effective length of said second line or lines.

40. The air moving device of claim 39, wherein:

said one or more first lines comprise shape memory alloy wires; and said means for selectively shortening an effective length of said first line or lines comprises an electrical circuit, said electric circuit being connected to said shape memory alloy wires and operative to selectively direct an electric current through said shape memory alloy wires so as to cause said shape memory alloy wires to contract.

41. The air moving device of claim 40, wherein:

said one or more second lines comprise shape memory alloy wires; and said means for selectively shortening an effective length of said second line or lines comprises an electrical circuit, said electric circuit being connected to said shape memory alloy wires and operative to selectively direct an electric current through said shape memory alloy wires so as to cause said shape memory alloy wires to contract.

42. The air moving device of claim 39, wherein said means for selectively shortening an effective length of said first line or lines comprises one or more winches operative to reel in said first line or lines.

43. The air moving device of claim 42, wherein said means for selectively shortening an effective length of said second line or lines comprises one or more winches operative to reel in said second line or lines.

44. The air moving device of claim 38, wherein means for alternately expanding said collapsible bag comprises one or more spring members positioned within said collapsible bag and operative to urge said collapsible bag away from said electrode while said variable volume enclosure is isolating said electrode from ambient air except through one or more passageways.

* * * * *

UNITED STATES PATENT AND TRADEMARK OFFICE
CERTIFICATE OF CORRECTION

PATENT NO. : 6,436,564 B1
DATED : August 20, 2002
INVENTOR(S) : Witzigreuter et al.

It is certified that error appears in the above-identified patent and that said Letters Patent is hereby corrected as shown below:

Title page,
Item [56], References Cited, OTHER PUBLICATIONS, "Restructing" should read
-- Restructuring --.

Column 16,
Line 22, "second" should read -- first --;
Line 25, "outer casing" should read -- fixed member --; "second" should read -- first --;
"said", third occurrence, should read -- an --.
Line 32, "first" should read -- second --;
Line 34, "fixed member" should read -- outer casing --;
Line 39, "contact" should read -- contract --.

Column 17,
Line 4, after "members" insert -- for being --.

Column 18,
Line 1, after "combination" insert -- of --.

Signed and Sealed this

Twenty-fourth Day of December, 2002

JAMES E. ROGAN
*Director of the United States Patent and Trademark Office*